(12) United States Patent
Musa

(10) Patent No.: US 7,414,103 B2
(45) Date of Patent: Aug. 19, 2008

(54) SILOXANE RESINS WITH OXETANE FUNCTIONALITY

(75) Inventor: Osama M. Musa, Hillsborough, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 245 days.

(21) Appl. No.: 11/505,083

(22) Filed: Aug. 16, 2006

(65) Prior Publication Data

US 2007/0037951 A1    Feb. 15, 2007

Related U.S. Application Data

(63) Continuation of application No. 10/901,861, filed on Jul. 29, 2004, now Pat. No. 7,135,535.

(51) Int. Cl.
*C08G 77/12* (2006.01)
(52) U.S. Cl. .............................. 528/31; 528/27; 528/32; 528/25
(58) Field of Classification Search ............. 528/31, 528/27, 32, 25
See application file for complete search history.

(56) References Cited

U.S. PATENT DOCUMENTS

| | | |
|---|---|---|
| 4,751,337 A | 6/1988 | Espy et al. |
| 4,877,820 A | 10/1989 | Cowan |
| 4,900,779 A | 2/1990 | Leibfried |
| 4,902,731 A | 2/1990 | Leibfried |
| 5,013,809 A | 5/1991 | Leibfried |
| 5,025,048 A | 6/1991 | Burnier |
| 5,077,134 A | 12/1991 | Leibfried |
| 5,118,735 A | 6/1992 | Burmier |
| 5,124,375 A | 6/1992 | Leibfried |
| 5,124,423 A | 6/1992 | Leibfried |
| 5,147,945 A | 9/1992 | Woodside et al. |
| 5,171,817 A | 12/1992 | Barnum et al. |
| 5,196,498 A | 3/1993 | Leibfried, Sr. |
| 5,242,979 A | 9/1993 | Barnum et al. |
| 5,260,377 A | 11/1993 | Weber et al. |
| 5,334,688 A | 8/1994 | Loo |
| 5,340,644 A | 8/1994 | Babcock et al. |
| 5,373,077 A | 12/1994 | Loo |
| 5,391,678 A | 2/1995 | Bard et al. |
| 5,408,026 A | 4/1995 | Cowan |
| 5,412,055 A | 5/1995 | Loo |
| 5,451,637 A | 9/1995 | Leibfried |
| 5,491,249 A | 2/1996 | Kostas |
| 5,512,376 A | 4/1996 | Brady et al. |
| 5,523,374 A | 6/1996 | Bard et al. |

FOREIGN PATENT DOCUMENTS

JP    11-199853    *    7/1999

* cited by examiner

*Primary Examiner*—Kuo-Liang Peng
(74) *Attorney, Agent, or Firm*—Jane E. Gennaro

(57) ABSTRACT

A linear or cyclic siloxane compound contains pendant carbon to carbon double bonds, Si—H bonds, and pendant oxetane functionality. These compounds have two curing temperatures, one associated with a hydrosilation reaction between the carbon to carbon double bond and the Si—H entity, and the other associated with the ring opening of the oxetane.

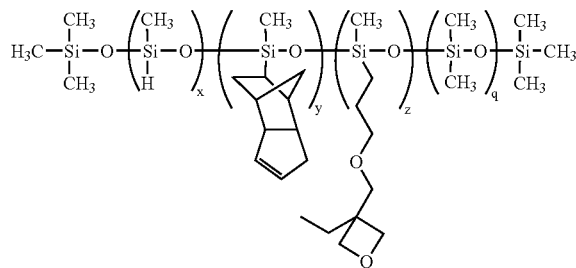

1 Claim, No Drawings

SILOXANE RESINS WITH OXETANE FUNCTIONALITY

This is a continuation of United States Ser. No. 10/901,861 filed on 29 Jul. 2004, now U.S. Pat. No. 7,135,535.

FIELD OF THE INVENTION

This invention relates to siloxane resins having oxetane functionality and to these resins in B-stageable compositions for attaching semiconductor chips to substrates.

BACKGROUND OF THE INVENTION

Included within the processing steps for the fabrication of a semiconductor package, a semiconductor die or chip is mechanically bonded with an adhesive to a substrate. The fabrication can take place in a continuous series of steps, or the substrate can be prepared with the adhesive for the mechanical attach, and then held until a later time.

If the fabrication process is to be interrupted after the deposition of the adhesive to the substrate and the assembly held to a later time, the adhesive must be in a solidified form for successful storage. The solidified form provides the further advantages of minimal or no bleeding, and better control of bondline thickness and bondline tilt, the bondline being the interface between the chip and the adhesive.

For some semiconductor packaging applications, paste adhesives are preferred over solid (film) adhesives for process reasons, yet the bond-line and fillet control of solids are desired. In such a case, an adhesive known as a B-stageable adhesive may be used. If the starting adhesive material is a solid, the solid is dispersed or dissolved in a solvent to form a paste and the paste applied to the substrate. The adhesive is then heated to evaporate the solvent, leaving a solid, but uncured, adhesive on the substrate. If the starting adhesive material is a liquid or paste, the adhesive is dispensed onto the substrate and heated to partially cure the adhesive to a solid state. The application of heat at this stage in fabrication is termed B-staging, and the adhesive, B-stageable.

Although there are the advantages to solid adhesives mentioned above, there are also disadvantages. After B-staging and during storage, solid adhesives are prone to absorbing moisture from the air under ambient conditions, or from substrates, especially organic substrates such as BT resins, printed circuit boards or polyimide flexible substrates. The adhesives also may contain a level of residual solvent or other volatiles.

At elevated attach temperatures, the absorbed moisture and residual volatile materials will evaporate rapidly. If this evaporation occurs faster than the vapors can diffuse out of the adhesive, voids or bubbles appear in the adhesive and can be a source of ultimate failure of the adhesive. This creates a need for curable compositions that are B-stageable but that do not promote voiding.

Cyclic or linear siloxane resins, such as those disclosed in U.S. Pat. Nos. 4,751,337, 4,877,820, 4,900,779, 4,902,731, 5,013,809, 5,025,048, 5,077,134, 5,118,735, 5,124,423, 5,124,375, 5,147,945, 5,171,817, 5,196,498, 5,242,979, 5,260,377, 5,334,688, 5,340,644, 5,373,077, 5,391,678, 5,408,026, 5,412,055, 5,451,637, 5,491,249, 5,523,374, 5,512,376, have pendant carbon to carbon double bonds introduced through the addition of dicyclopentadiene to the linear or cyclic siloxane backbone. These siloxane compounds have superior stability and very low moisture absorption, however, they have less than optimum adhesive properties.

Oxetane resins are highly reactive cyclic ethers that can undergo both cationic and anionic ring opening homopolymerization, and in general, exhibit good adhesion, shrink minimally upon cure, and polymerize readily. A combination of the properties found in oxetane compounds and in siloxane compounds, in which the siloxane compounds contain Si—H bonds and carbon to carbon double bond functionality, would be an advantage in uses requiring dual cure materials, such as in B-stageable adhesives for use in electrical, electronic, photonic, and optoelectronic applications.

SUMMARY OF THE INVENTION

This invention is a linear or cyclic siloxane compound that contains at least one Si—H bond, at least one pendant carbon to carbon double bond, and at least one pendant oxetane functionality. When homopolymerized, these compounds have two curing temperatures, one associated with a hydrosilation reaction between the carbon to carbon double bond and the Si—H entity, and the other associated with the ring opening of the oxetane. The first cure occurs at about 110° C., and the second cure occurs at about 150° C. These curing temperatures are sufficiently separated to allow the oxetane functionality to react (ring open) during a B-staging process and the carbon to carbon double bond and Si—H hydorsilation reaction to occur at a later stage. These compounds are useful in compositions for use within the semiconductor packaging industry, for example, as lid sealants, underfills, films, die attach materials, and B-stageable adhesives.

DETAILED DESCRIPTION OF THE INVENTION

The siloxane starting compounds and methods for their preparation are disclosed in the US patents listed in the Background section of this specification. In general, the starting siloxane compounds will have the linear structure

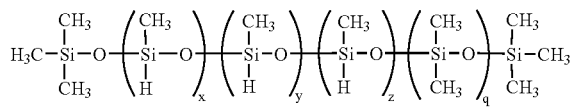

or the cyclic structure

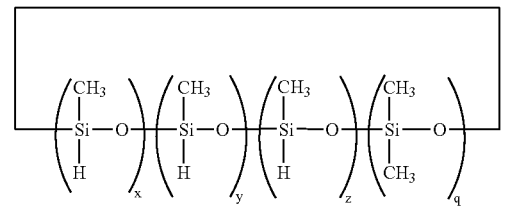

in which x, y, and z represent the mole percentage of Si—H sites to a total of 100 mole %. The x sites represent those that remain as unsubstituted Si—H sites. The y sites represent those that will contain pendant carbon to carbon unsaturation after hydrosilation with dicyclopentadiene. The z sites represent those that will contain pendant oxetane functionality after hydrosilation with the carbon to carbon double bond on a compound containing both double bond and oxetane functionality. The q sites represent those that will not undergo hydrosilation (there being no Si—H bonds on these sites) and is reported as an integer.

To form the inventive compounds, the starting materials are reacted via hydrosilation with (i) dicyclopentadiene and with (ii) a compound containing oxetane functionality and carbon to carbon double bond functionality (the oxetane starting compound). A suitable oxetane starting compound is allyl oxetane. Reaction of the dicyclopentadiene will occur between the norbornene double bond on dicyclopentadiene and a Si—H site on the starting siloxane compound to add pendant carbon to carbon unsaturation to the starting siloxane compound. Reaction of the starting oxetane compound will occur between the carbon to carbon double bond on the oxetane starting compound and a Si—H site on the starting siloxane compound to add pendant oxetane functionality to the starting siloxane compound. These reactions can be run simultaneously or sequentially at the preference of the practitioner and are nonselective to the Si—H sites. The resultant compounds are colorless liquids with viscosities less than 1,000 mPa.s at 25° C.

The mol percent for each x, y, and z site will range from 5 to 90% for each site, with the total being 100% for x+y+z. In general, it is preferable to have as near equivalent molar levels of substitution of the x, y, and z sites as possible to obtain equivalent levels of crosslinking in subsequent curing reactions. The unsubstituted sites, represented by q, will range from 1 to 50. As will be understood, in this specification, with respect to x, y, and z, a site refers to the bond between a hydrogen atom and a silicon atom on the siloxane starting compound; with respect to q, a site refers to the bond between an alkyl group (typically methyl) and a silicon atom on the siloxane starting compound. Also as will be understood, it is not always possible to recite with 100% accuracy the level of substitution at the sites; in particular, the value for q is approximate, represented by the symbol "~".

Examples of compounds that fall within the above description have the cyclic structure

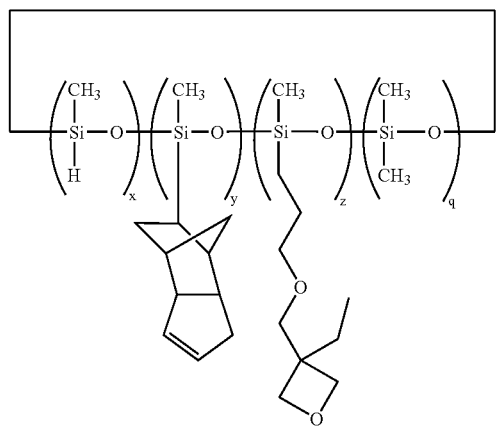

or the linear structure

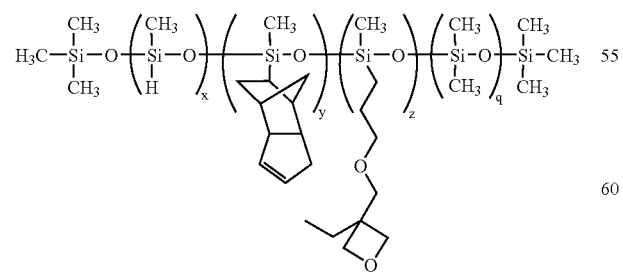

in which x, y, and z represent the mol % substitution to a total of 100%, and q is an integer from 1 to 50.

These compounds may also be blended with other materials having carbon to carbon unsaturation, or with materials that undergo cationic ring opening, such as epoxy, oxetane (other than the inventive compounds disclosed herein), benzoxazines, and oxazolines. As will be understood by those skilled in the art, the carbon to carbon double bonds in the additional materials will react with the pendant carbon to carbon double bonds on the inventive compounds, and the materials that undergo cationic ring opening will react with the oxetane functionality. By judicious choice of additional reactants, one skilled in the art will be able to prepare compounds with curing capabilities to meet many varied end uses.

In the following examples, the linear and cyclic siloxanes were purchased from Gelest and are indicated by product codes HMS and MHCS.

EXAMPLE 1

Compound 1

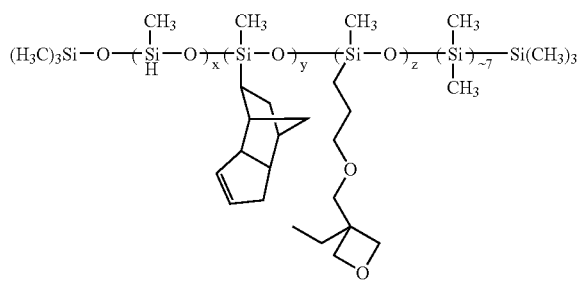

x=39 mol %, y=28 mol %, z=33 mol %.

The initial charge, a linear siloxane HMS-501 (25.15 g, Si—H=0.162 mol) and toluene (30 mL), was added to a 500-mL 4-neck round bottom flask. The reaction vessel was placed under a $N_2$ blanket and equipped with an overhead stirrer and condenser. Stirring was continued until the mixture became homogeneous. The temperature was kept between 65° and 70° C. Allyl oxetane (8.424 g, 0.0541 mol), dicyclopentadiene (7.14 g, 0.0541 mol), 50 ppm dichloro (1,5 cyclooctadiene) Platinum(II) was charged to the flask dropwise over a period of one hour. The reaction was monitored by FT-IR analysis for the consumption of norbornyl double bond (peak at 1342 cm−1). The reaction was completed after 17 hours. After this interval, the solvent was removed in vacuo (60° C., 0.3 mm Hg) to afford a pale yellow liquid.

EXAMPLE 2

Compound 2

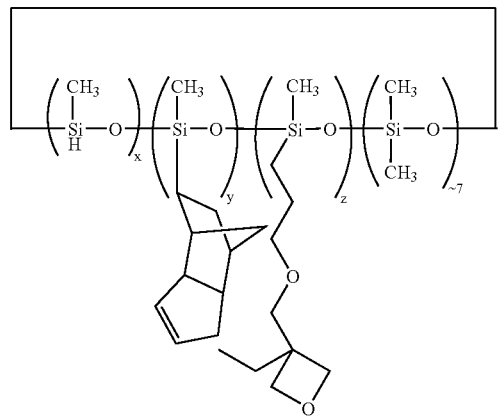

x=44 mol %, y=30 mol %, z=26 mol %.

The initial charge, a cyclic siloxane MHCS (25.0 g, Si—H=0.411 mol) and toluene (30 mL), was added to a 500-mL 4-neck round bottom flask. The reaction vessel was placed under a $N_2$ blanket and equipped with an overhead stirrer and condenser. Stirring was continued until the mixture became homogeneous. The temperature was kept between 65° and 70° C. Allyl oxetane (21.385 g, 0.137 mol), dicyclopentadiene (18.084 g, 0.137 mol), and 22.5 ppm dichloro(1,5 cyclo-octadiene) Platinum(II) was charged to the flask dropwise over a period of one hour. The reaction was monitored by FT-IR analysis for the consumption of norbornyl double bond (peak at 1342 cm−1). The reaction was completed after eight hours. After this interval, the solvent was removed in vacuo (60° C., 0.3 mm Hg) to afford a pale yellow liquid.

EXAMPLE 3
Compound 3

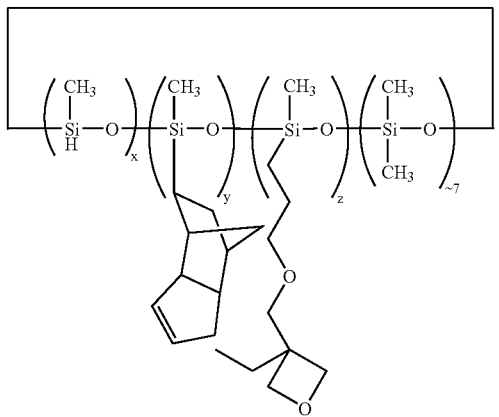

x=43 mol %, y=42 mol %, z=15 mol %.

The initial charge, a cyclic siloxane MHCS (25.0 g, Si—H=0.411 mol) and toluene (30 mL), was added to a 500-mL 4-neck round bottom flask. The reaction vessel was placed under a $N_2$ blanket and equipped with an overhead stirrer and condenser. Stirring was continued until the mixture became homogeneous. The temperature was kept between 65° and 70° C. Allyl oxetane (9.622 g, 0.062 mol), dicyclopentadiene (24.54 g, 0.175 mol), and 17.5 ppm dichloro(1,5 cyclo-octadiene) Platinum(II) was charged to the flask dropwise over a period of one hour. The reaction was monitored by FT-IR analysis for the consumption of norbornyl double bond (peak at 1342 cm$^{-1}$). The reaction was completed after five hours. After this interval, the solvent was removed in vacuo (60° C., 0.3 mm Hg) to afford a pale yellow liquid.

EXAMPLE 4
Compound 4

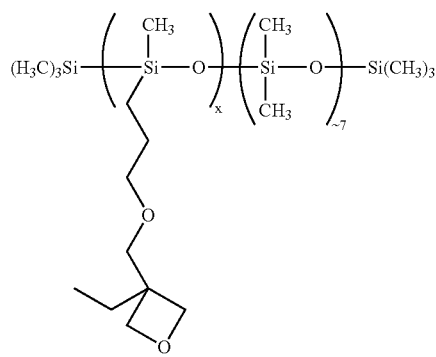

x=100 mol %

The initial charge, a linear siloxane HMS-501 (25.15 g, Si—H=0.162 mol) and toluene (30 mL), was added to a 500-mL 4-neck round bottom flask. The reaction vessel was placed under a $N_2$ blanket and equipped with an overhead stirrer and condenser. Stirring was continued until the mixture became homogeneous. The temperature was kept between 65° and 70° C. Allyl oxetane (25.27 g, 0.162 mol) and 100 ppm platinum divinyltetramethyldisiloxane complex in xylene was charged to the flask dropwise over a period of one hour. The reaction was monitored by FT-IR analysis for the consumption of Si—H bond (peak at 2160 cm−1). The reaction was completed after five hours. After this interval, the solvent was removed in vacuo (60° C., 0.3 mm Hg) to afford a pale yellow liquid.

EXAMPLE 5

Thermogravimetric Analysis (TGA). TGA was used to determine the volatility of the resins in Examples 1 through 4. A sample of each resin was heated from room temperature to 350° C. at a ramp rate of 10° C./min. For electronic applications, the weight loss percentage of neat resin preferably is less than 10% at 200° C. For the resins in Examples 1, 3, and 4, the weight losses at 200° C. were less than 10 wt %, while that of Example 2 was 13% at 200° C. The resin from Example 2, however, is sufficiently reactive to cure into a formulation before volatilization occurs.

EXAMPLE 6

Formulations. The compounds from Examples 1, 2, 3, and 4 were each formulated into a series of three compositions comprising the compound and initiators. The first composition comprises the Example compound and 1 wt % of Rhodorsil 2074. Rhodorsil 2074 is a cationic photoinitiator catalyst (available from Rhodia) added to catalyze the homopolymerization of the oxetane substituent. The second composition comprises the Example compound, 1 wt % of Rhodorsil 2074, and 1 wt % radical initiator, USP90MD (available from Akzo Nobel). The third composition comprises the Example compound, 1 wt % Rhodorsil 2074, and 1 wt % benzopinacole, a radical initiator.

The radical initiator behaves as a reducing agent for Rhodorsil 2074 during decomposition. As a result, a strong acid is generated which subsequently initiates oxetane ring-opening.

The compositions for each Example compound were analyzed separately by DSC to measure kinetic and thermodynamic properties. The results are reported in Table 1 and indicate there is extensive hydrosilation and cationic oxetane ring-opening in the compounds from Examples 1, 2, and 3 using these initiator systems. The cationic oxetane ring-opening occurs at the lower temperature. There is no hydrosilation of the compound from Example 4 since 100 mol % of the silicon hydride groups were modified with oxetane functionality; consequently, there is only one cure peak for these formulations. The data show that these compounds undergo dual cures, with sufficient differential between the two curing temperatures so that a B-stageable composition is obtainable.

TABLE 1

Kinetic and Thermodynamic Properties of
Compositions Containing Compounds 1, 2, 3, and 4

| Compositions | Cure Temp (° C.) | ΔH (J/g) | Cure Temp (° C.) | ΔH (J/g) |
|---|---|---|---|---|
| Example 1 Compound 1 wt % Rhodorsil 2074 | 111 | −135 | 236 | −64 |
| Example 1 Compound 1 wt % Rhodorsil 2074 1 wt % USP90MD | 108 | −153 | 162 | −191 |
| Example 1 Compound 1 wt % Rhodorsil 2074 1 wt % Benzopinacole | 107 | −251 | 137 | −116 |
| Example 2 Compound 1 wt % Rhodorsil 2074 | 88 | −117 | 161 | −353 |
| Example 2 Compound 1 wt % Rhodorsil 2074 1 wt % USP90MD | 81 | −137 | 157 | −365 |
| Example 2 Compound 1 wt % Rhodorsil 2074 1 wt % Benzopinacole | 84 | −109 | 164 | −455 |
| Example 3 Compound 1 wt % Rhodorsil 2074 | 102 | −71 | 167 | −161 |
| Example 3 Compound 1 wt % Rhodorsil 2074 1 wt % USP90MD | 101 | −63 | 156 | −319 |
| Example 3 Compound 1 wt % Rhodorsil 2074 1 wt % Benzopinacole | 104 | −67 | 158 | −322 |
| Example 4 Compound 1 wt % Rhodorsil 2074 | 88 | −221 | 218 | −12 |
| Example 4 Compound 1 wt % Rhodorsil 2074 1 wt % USP90MD | 98 | −211 | None | None |
| Example 4 Compound 1 wt % Rhodorsil 2074 1 wt % Benzopinacole | 89 | −222 | None | None |

What is claimed:

1. An adhesive composition comprising a linear or cyclic siloxane compound that contains at least one Si—H bond, at least one pendant carbon to carbon double bond, and at least one pendant oxetane functionality.

* * * * *